US012246537B2

(12) United States Patent
Shimomura et al.

(10) Patent No.: US 12,246,537 B2
(45) Date of Patent: Mar. 11, 2025

(54) NOZZLE PLATE, INKJET HEAD, NOZZLE PLATE MANUFACTURING METHOD, AND INKJET HEAD MANUFACTURING METHOD

(71) Applicant: Konica Minolta, Inc., Tokyo (JP)

(72) Inventors: Akihisa Shimomura, Atsugi (JP); Tadashi Hirano, Hino (JP); Tomohiro Nishiura, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 173 days.

(21) Appl. No.: 18/001,435

(22) PCT Filed: Jun. 21, 2021

(86) PCT No.: PCT/JP2021/023363
§ 371 (c)(1),
(2) Date: Dec. 9, 2022

(87) PCT Pub. No.: WO2022/004459
PCT Pub. Date: Jan. 6, 2022

(65) Prior Publication Data
US 2023/0234354 A1 Jul. 27, 2023

(30) Foreign Application Priority Data
Jun. 29, 2020 (JP) ................................ 2020-111031

(51) Int. Cl.
*B41J 2/14* (2006.01)
*B41J 2/16* (2006.01)

(52) U.S. Cl.
CPC ............. *B41J 2/1433* (2013.01); *B41J 2/162* (2013.01); *B41J 2/1623* (2013.01)

(58) Field of Classification Search
CPC ........ B41J 2/1433; B41J 2/162; B41J 2/1629; B41J 2/1623
See application file for complete search history.

(56) References Cited

U.S. PATENT DOCUMENTS

2017/0106649 A1* 4/2017 Noguchi .............. B41J 2/14233
2018/0086065 A1* 3/2018 Yamazaki .............. B41J 2/1623
2020/0198351 A1* 6/2020 Mikoshiba ............. H05K 3/361
2021/0179873 A1* 6/2021 Fujita .................. B41J 2/14233

FOREIGN PATENT DOCUMENTS

EP 1065059 A2 1/2001
JP 2000-246475 A 9/2000
JP 2003251811 A * 9/2003
JP 3755332 B2 3/2006
(Continued)

OTHER PUBLICATIONS

Matsuda, Machine TranslationofJP-2008284579-A (Year: 2008).*
(Continued)

*Primary Examiner* — Scott A Richmond
(74) *Attorney, Agent, or Firm* — LUCAS & MERCANTI, LLP

(57) ABSTRACT

There is provided a nozzle plate of an inkjet head, the nozzle plate including: a first surface that is bonded to an upper layer substrate by an adhesive; and a second surface in which an opening of a nozzle that ejects an ink is provided. A step is formed at an edge of the first surface.

10 Claims, 5 Drawing Sheets

(56) References Cited

FOREIGN PATENT DOCUMENTS

| | | | | |
|---|---|---|---|---|
| JP | 2007-307842 | A | | 11/2007 |
| JP | 2008284579 | A | * | 11/2008 |
| JP | 2017-061115 | A | | 3/2017 |
| JP | 2019-217706 | A | | 12/2019 |

OTHER PUBLICATIONS

Ito, MachineTranslationofJP-2003251811-A, 2003 (Year: 2003).*

Matsuda,MachineTranslationofJP-2008284579-A, 2008 (Year: 2008).*

International Search Report for the corresponding patent application No. PCT/JP2021/023363 dated Aug. 31, 2021, with English translation.

Extended European Search Report dated Nov. 30, 2023, for the corresponding European patent application No. 21834473.7.

International Preliminary Report on Patentability dated Dec. 13, 2022, for the corresponding patent application No. PCT/JP2021/023363, with English translation.

* cited by examiner

NOZZLE PLATE, INKJET HEAD, NOZZLE PLATE MANUFACTURING METHOD, AND INKJET HEAD MANUFACTURING METHOD

CROSS REFERENCE TO RELATED APPLICATION

This Application is a 371 of PCT/JP2021/023363 filed on Jun. 21, 2021, which claimed priority of Japanese Application No. 2020-111031 filed Jun. 29, 2020, both of which are incorporated herein by reference.

TECHNICAL FIELD

The present invention relates to a nozzle plate, an inkjet head, a nozzle plate manufacturing method, and an inkjet head manufacturing method.

BACKGROUND ART

The inkjet head, which ejects ink, consists of the nozzle plate, which is a base material with a nozzle formed on it, to which a channel base material is bonded with an adhesive, and ink is ejected from the nozzle. As a method of forming the nozzle on the base material, a tool is pressed into the base material and squeezed so that the concave portion reaches the back surface of the base material, and then the convex portion on the back surface of the base material is polished to transfer the shape of the tool so that it penetrates the base material (see, for example, Patent Document 1).

SUS (Steel Use Stainless, stainless steel) and other metals are used as the base material of the nozzle plate from the viewpoints of chemical stability against ink and durability against mechanical friction. Wet etching with an etching solution (see Patent Document 2) and laser etching with a laser device (see Patent Document 3) are known as methods for processing the nozzle plate external shape from the metal plate on which the nozzle is formed.

PRIOR ART DOCUMENT

Patent Document

Patent Document 1: JP 3755332 B2
Patent Document 2: JP 2019-217706 A
Patent Document 3: JP 2007-307842 A

DISCLOSURE OF THE INVENTION

Problems to be Solved by the Invention

However, when wet etching is used to perform external shaping, the resist mask may penetrate into the nozzle, and resist residue may remain in the nozzle even after the resist is peeled off after the external shaping.

Furthermore, when external shaping is performed by laser etching, bonding defects or voids may occur near the laser processing position due to convexity caused by dross. Although the generation of dross can be suppressed by using a short-pulse laser such as picosecond or fetom-second lasers as the laser equipment, the cost of the equipment is higher than that of the nanosecond pulse laser equipment commonly used, making it less economical.

In addition, when bonding the channel base material to the nozzle plate, there is a risk of adhesive defects where the adhesive protrudes to the sides.

The present invention was made in view of these circumstances, and its purpose is to provide a nozzle plate, an inkjet head, a nozzle plate manufacturing method, and an inkjet head manufacturing method that can suppress bonding defects or voids during bonding.

Means for Solving the Problem

In order to solve the above problem, the invention as recited in claim 1 is a nozzle plate of an inkjet head, the nozzle plate including: a first surface that is bonded to an upper layer substrate by an adhesive; and a second surface in which an opening of a nozzle that ejects an ink is provided, wherein a step is formed at an edge of the first surface.

The invention as recited in claim 2 is the nozzle plate according to claim 1, wherein a dross is attached to the step.

The invention as recited in claim 3 is the nozzle plate according to claim 1 or 2, wherein a base material that forms the nozzle plate is silicon or metal.

The invention as recited in claim 4 is the nozzle plate according to any one of claims 1 to 3, wherein the step has a depth of 5 μm to 10 μm inclusive, in a center direction of the nozzle plate.

The invention as recited in claim 5 is an inkjet head including the nozzle plate according to any one of claims 1 to 4.

The invention as recited in claim 6 is a nozzle plate manufacturing method for the nozzle plate according to any one of claims 1 to 4, the nozzle plate manufacturing method including: a grooving process that is forming a recess in the first surface so as to form external shapes of multiple nozzle plates for a single base material; a nozzle forming process that is forming the nozzle such that the opening is formed in the second surface of the base material; and an external shaping process that is cutting the recess by laser processing and cutting out the nozzle plates from the base material.

The invention as recited in claim 7 is the nozzle plate manufacturing method according to claim 6, wherein the recess is formed by wet etching.

The invention as recited in claim 8 is the nozzle plate manufacturing method according to claim 6 or 7, further including a water repellent film forming process that is forming a water repellent film in the second surface.

The invention as recited in claim 9 is an inkjet head manufacturing method including: a nozzle plate manufacturing process that is manufacturing the nozzle plate according to any one of claims 1 to 4; and a bonding process that is bonding the first surface of the nozzle plate to the upper layer substrate by the adhesive.

Effects of the Invention

According to the nozzle plate, the inkjet head including the nozzle plate, the nozzle plate manufacturing method, and the inkjet head manufacturing method of the present invention, it is possible to suppress the occurrence of bonding defects or voids during bonding.

EMBODIMENTS FOR CARRYING OUT THE INVENTION

Hereinafter, embodiments of the nozzle plate, the inkjet head including the nozzle plate, the nozzle plate manufacturing method, and the inkjet head manufacturing method will be described based on the drawings.

Figure 1A:
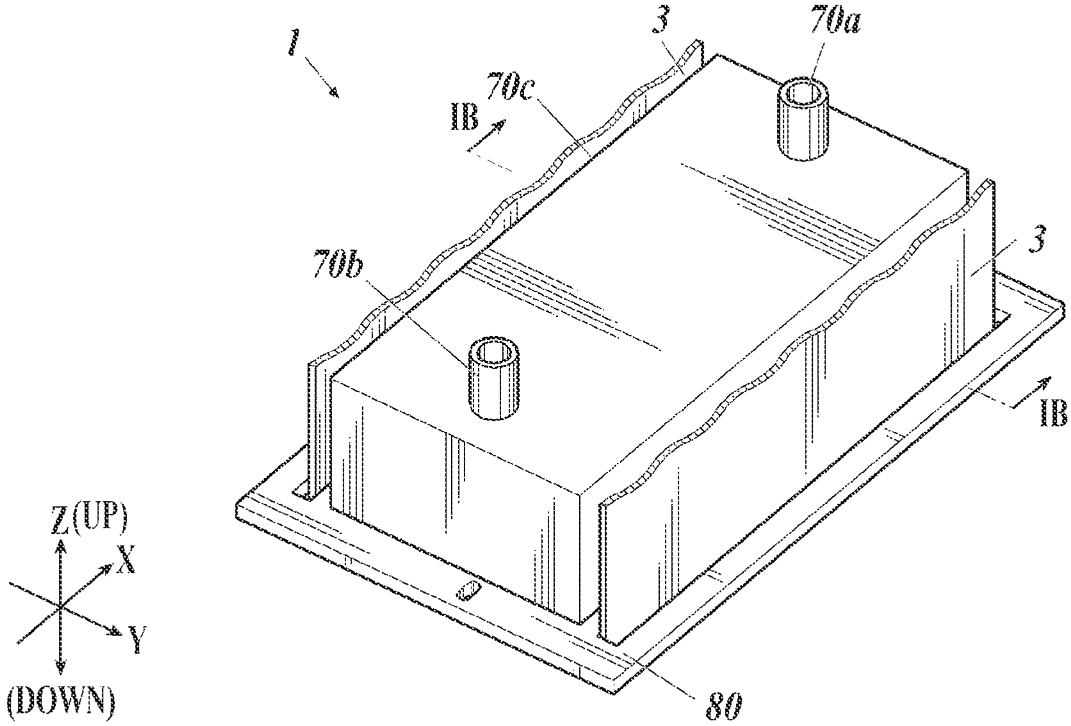
FIG. 1A is an overall view of the inkjet head according to the embodiment.
Figure 1B:
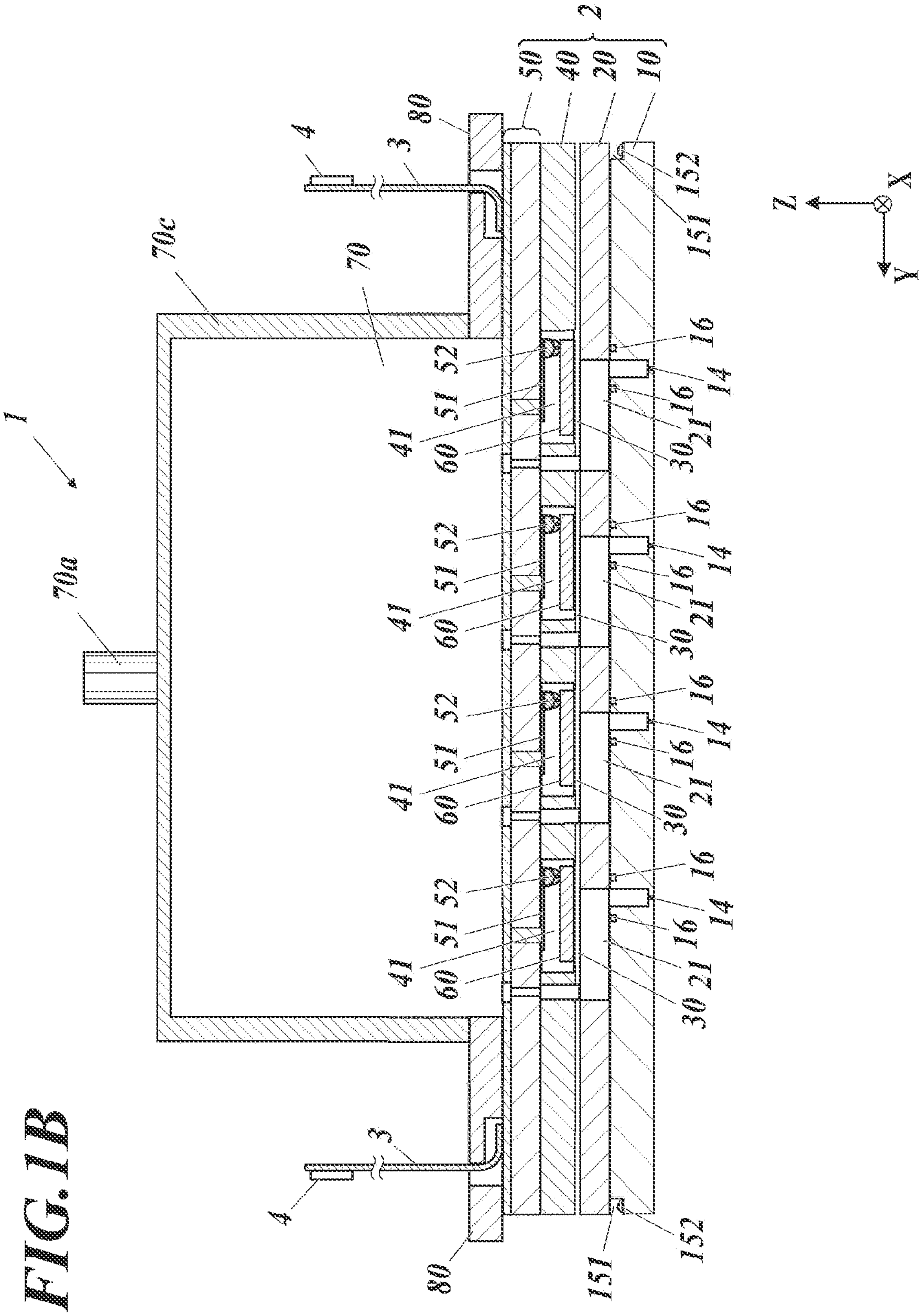
FIG. 1B is a cross-sectional view along the IB-IB line of FIG. 1A.

FIG. 1A is an overall view of the inkjet head 1 according to the embodiment, and FIG. 1B is a cross-sectional view of the inkjet head 1 of FIG. 1A viewed from the side (−X direction side) along the IB-IB line. FIG. 1B shows a cross-section of the inkjet head 1 in the surface containing the four nozzles 14 included in four nozzle rows.

The inkjet head 1 includes a head chip 2, a common ink chamber 70, a support substrate 80, a wiring member 3, a drive section 4, and the like.

The head chip 2 is configured to eject ink from the nozzles 14, and is made up of multiple (in this case, four) board-like substrates that are stacked and formed. The lowest substrate in the head chip 2 is the nozzle plate 10. The nozzle plate 10 has multiple nozzles 14, and ink can be ejected nearly perpendicularly to the ink ejection surface (the exposed surface of the nozzle plate 10) where the openings of the nozzles 14 are provided. On the opposite side of the nozzle plate 10 from the ink ejection surface, the pressure chamber substrate 20 (chamber plate), spacer substrate 40, and wiring substrate 50 are bonded and stacked by adhesive or the like in order toward the upper direction (+Z direction). In the following, the nozzle plate 10, pressure chamber substrate 20, spacer substrate 40, and wiring substrate 50 are also individually or collectively referred to as channel substrates 10, 20, 40, 50, and the like.

These channel substrates 10, 20, 40, and 50 are provided with ink channels that are connected to the nozzles 14, and are open on the surface on the exposed side (+Z direction side) of the wiring substrate 50. On the exposed surface of the wiring substrate 50, a common ink chamber 70 is provided to cover all openings. The common ink chamber 70 has, at the upper section, an ink supply portion 70*a* that supplies ink to the ink chamber forming member 70*c* and an ink discharge portion 70*b* that discharges ink from the ink chamber forming member 70*c*. The ink stored in the ink chamber forming member 70*c* of the common ink chamber 70 is supplied to each nozzle 14 from the opening of the wiring substrate 50.

In the middle of the ink channel, a pressure chamber 21 is provided. The pressure chamber 21 is provided through the pressure chamber substrate 20 in the vertical direction (Z direction), and the top surface of the pressure chamber 21 is composed of a diaphragm 30 provided between the pressure chamber substrate 20 and the spacer substrate 40. The pressure change is imparted to the ink in the pressure chamber 21 by the deformation of the diaphragm 30 (pressure chamber 21) due to the displacement (deformation) of the piezoelectric element 60 in the storage section 41 which is provided adjacent to the pressure chamber 21 via the diaphragm 30. By an appropriate pressure change being applied to the ink in the pressure chamber 21, the ink in the ink channel is ejected as a droplet from the nozzle 14 that is connected to the pressure chamber 21.

The support substrate 80 is bonded to the top surface of the head chip 2 and holds the ink chamber forming member 70*c* of the common ink chamber 70. The support substrate 80 is provided with the opening of approximately the same size and shape as the opening on the bottom surface of the ink chamber forming member 70*c*. The ink in the common ink chamber 70 is supplied to the top surface of the head chip 2 through the opening in the bottom surface of the ink chamber forming member 70*c* and the opening in the support substrate 80.

The wiring member 3 is, for example, an FPC (Flexible Printed Circuits), or the like, and is connected to the wiring of the wiring substrate 50. The piezoelectric element 60 is displaced by the drive signal transmitted to the wiring 51 and the connection 52 (conductive member) in the storage section 41 via this wiring. The wiring member 3 is drawn through the support substrate 80 and connected to the drive section 4.

The drive section 4 receives control signals from the control section of the inkjet recording device and power supply from the power supply section. The drive section 4 outputs appropriate drive signals of the piezoelectric element 60 to the wiring member 3 according to the ink ejection or non-ejection operation from each nozzle 14. The drive section 4 is composed of an IC (Integrated Circuit) or the like.

Figure 2:
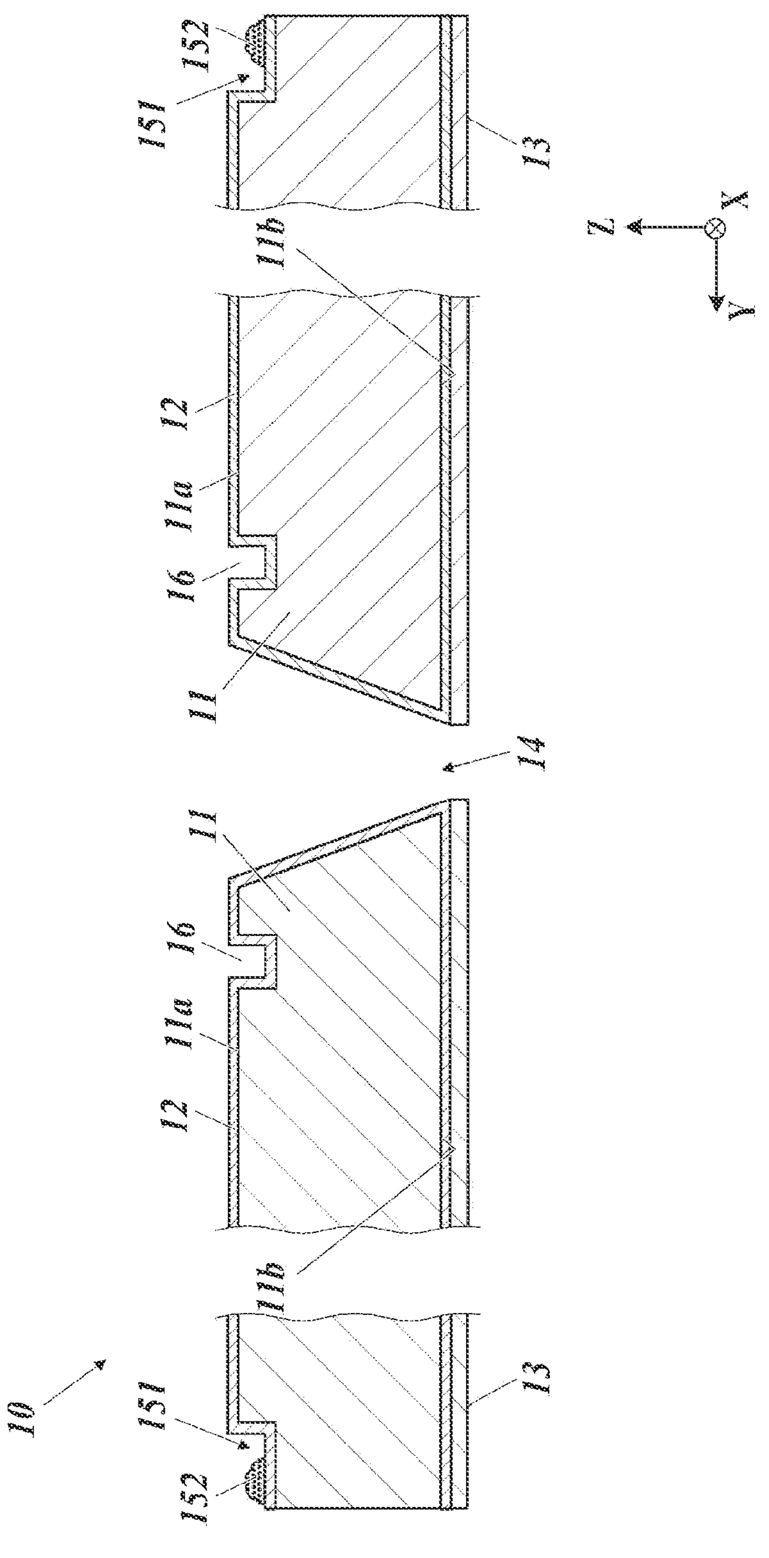
FIG. 2 is an enlarged cross-sectional view of the nozzle plate according to the embodiment.

FIG. 2 is a cross-sectional view showing the configuration of the nozzle plate 10. FIG. 2 shows an enlarged cross-sectional view of the nozzle plate 10.

The nozzle plate 10 consists of a substrate 11 cut from a base material and provided with nozzles 14, a protective film 12 provided on the plate surface of the substrate 11 and the inner wall surfaces of the nozzles 14, a water repellent film 13 formed on the underside of substrate 11 to be overlaid on the protective film 12, a step 151 that is a cut provided at the edge, and glue guards 16 provided on both sides of each nozzle 14.

In the following, the upper side surface of the substrate 11 is referred to as the first surface 11*a*, the lower side surface of the substrate 11 is referred to as the second surface 11*b*.

The substrate 11 is a plate-shaped member cut from a base material such as SUS (Steel Use Stainless, stainless steel) with a thickness of approximately 25 μm to 300 μm. By using SUS as the base material, the nozzle plate 10 can be formed with excellent chemical stability against ink and mechanical friction durability. As described below, when a silicon substrate is used as the substrate 11, a thermal oxide film may be formed on the outer layer of the substrate 11.

The nozzle 14 is a cylindrical hole with a circular opening on the second surface 11*b* of the substrate 11. The diameter of opening of the nozzle 14 can be approximately 15 μm to 30 μm.

For the protective film 12, a material that does not dissolve upon contact with the ink, such as silicon carbide (SiC), silicon oxi carbide (SiOC), and silicon oxide ($SiO_2$), as well as metal oxide films such as aluminum oxide ($Al_2O_3$), zirconium oxide ($ZrO_2$), titanium oxide ($TiO_2$), hafnium oxide ($HfO_2$) and tantalum oxide ($Ta_2O_3$), and metal silicate films containing silicon in metal oxide films (tantalum silicate (TaSiO), etc.) can be used.

The thickness of the protective film 12 is not limited, but is desirably, for example, 50 nm to 500 nm.

The protective film 12 made of such ink-resistant material inhibits the substrate 11 from being eroded by ink (especially, alkaline or acidic ink). The protective film 12 may also be used as a base film for the water repellent film 13 described below. Since the ink-resistant protective film 12 is not easily peeled off when it comes into contact with ink, by using the protective film 12 as the base film, it is possible to suppress the peeling of the water repellent film 13 together with the protective film 12 as the base film.

The water repellent film 13 is formed on top of the protective film 12, and its surface forms the ink ejection surface. The water repellent film 13 is a layer provided to have water repellency against ink and to inhibit adhering of ink and foreign matter. As the water repellent film 13, the water repellent film 13 is formed by vapor deposition of a silane coupling agent having perfluoroxyl groups, using the protective film 12 made of the aforementioned material as the base film.

The water repellent film 13 has openings through the water repellent film 13 at the positions where the nozzles 14 are formed, and ink ejected from the nozzles 14 is ejected through the openings.

The step 151 is a cut provided along the periphery of the first surface 11*a*, and dross 152 generated by laser processing, which will be described later, is attached to the edge. The step 151 is a space that prevents the dross 152 from interfering with the bonding of the nozzle plate 10 and the channel substrate 20, the dross 152 being generated when external shaping is performed to the recess 15 of the nozzle plate 10. 152. The step 151 is also a space to contain the adhesive that protrudes from the edge surface of the nozzle plate 10 during the bonding of the nozzle plate 10 and the channel substrate 20.

The depth of the step 151 is not limited, but is preferably 5 μm to 10 μm.

The glue guard 16 is a recessed groove section provided so that it is nearly parallel to the row of nozzles 14. By providing the glue guard 16, when the nozzle plate 10 is bonded to the pressure chamber substrate 20, which is the upper layer substrate, with adhesive, there is less risk of excess adhesive getting into the nozzle 14.

In FIG. 2, one glue guard 16 is provided on each side of the nozzle 14, but the position and number of glue guards are not limited to this.

Next, the manufacturing method of the inkjet head 1 of the embodiment is described, focusing on the manufacturing method of the nozzle plate 10.

Figure 3:
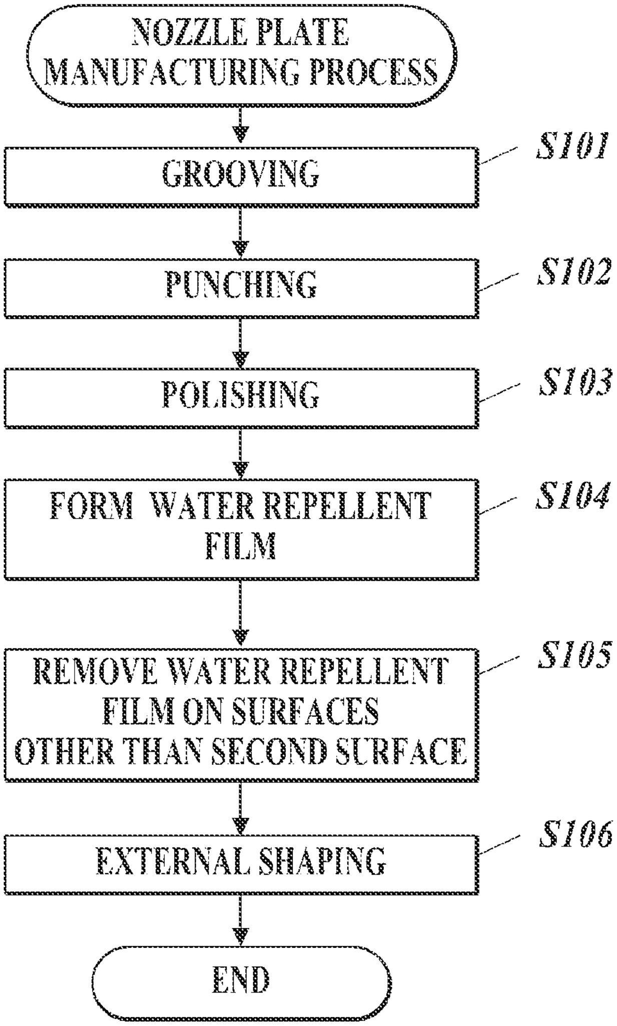
FIG. 3 is a flowchart showing the nozzle plate manufacturing method according to the embodiment.

FIG. 3 is a flowchart showing the procedure of the process for manufacturing the nozzle plate 10 (nozzle plate manufacturing process). FIGS. 4A to 4D are top views and cross-sectional views along the A-B line illustrating the nozzle plate manufacturing process.

As shown in FIG. 4A to FIG. 4D, according to the nozzle plate manufacturing process for the embodiment, multiple nozzle plates 10 can be manufactured simultaneously from a single base material.

Figure 4A:
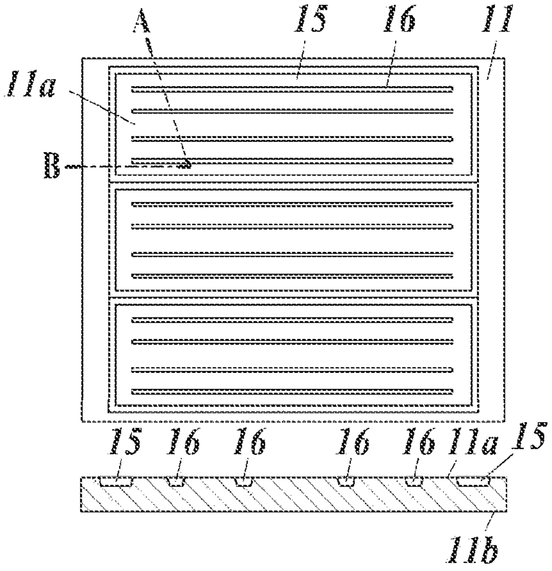
FIG. 4A is a top view and a cross-sectional view along the A-B line showing the nozzle plate manufacturing method according to the embodiment.

In the nozzle plate manufacturing process, first, as shown in FIG. 4A, the portion of the first surface 11*a* of the substrate 11 that is to be subjected to external shaping in step S106 which is a later process is subjected to grooving (half etching) by a wet etching process to form the recess 15 (Step S101).

The wet etching process can be performed by forming a resist mask on the substrate 11, excluding the grooving area, and immersing it in the etchant. It is sufficient that the resist mask is able to protect the substrate 11 against the etchant, and the resist mask can be made of inorganic material such as silicon, for example. As an etchant, for example, if the substrate 11 is a SUS base material, a neutral salt etchant, which is an aqueous solution containing ferric chloride ($FeCl_2$), copper chloride ($CuCl_2$) or the like is generally used. When the substrate 11 is a silicon substrate, a mixture of nitric acid ($HNO_3$) and hydrofluoric acid (HF) is generally used. However, it is not limited to this, and any of the known etchants can be selected.

After the wet etching process, the resist mask is removed from the surface of the substrate 11.

In the grooving process, the glue guard 16 which is the concave groove section parallel to the row of nozzles 14 to be formed is formed at the same time.

Figure 4B:
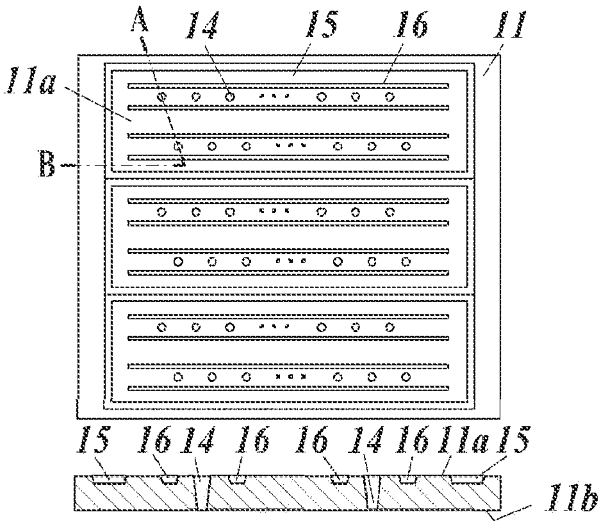
FIG. 4B is a top view and a cross-sectional view along the A-B line showing the nozzle plate manufacturing method according to the embodiment.

Next, as shown in FIG. 4B, punching is performed on the substrate 11 to form the nozzles 14 (Step S102).

As the punching, the tool is used to press the substrate 11. Specifically, one side of the nozzle forming portion of the tool and the first surface 11*a* of the substrate 11 are made to face each other, and the nozzle forming portion is pressed against the first surface 11*a*. As a result, nozzle recesses which are concave toward the second surface 11*b* are formed on the first surface 11*a*, and nozzle convex portions are formed on the second surface 11*b*.

Next, the nozzle convex portions protruding from the second surface 11*b* are polished and removed (Step S103). Then, the nozzles 14 are opened on the second surface 11*b*.

As a result, the substrate 11 has nozzles 14 that penetrate from the first surface 11*a* to the second surface 11*b*.

Next, the protective film 12 is formed on the nozzle plate 10, and the water repellent film 13 is formed on the second surface 11*b*, which is the ink ejection surface side (Step S104).

First, the surface of the substrate 11 is cleaned to remove foreign matter adhering to the substrate 11. The method of cleaning the substrate 11 can be, for example, US cleaning.

After cleaning the substrate 11, an ion bombardment treatment is performed on the surface of the substrate 11. Ion bombardment treatment is a treatment in which physical effects are exerted on the material to be treated by bombarding the material to be treated with ions in a reduced pressure environment.

This ion bombardment treatment removes impurities and thin oxide films from the surface of the substrate 11 to clean it and improve the adhesion property of the protective film 12. In addition, oxidation of the surface of the substrate 11 is suppressed.

After ion bombardment treatment, the protective film 12 is formed on the surface of the substrate 11 by the plasma CVD method, and the substrate 11 having the protective film 12 is cleaned to remove foreign matter adhering to the protective film 12. The method of cleaning the protective film 12 can be US cleaning as described above.

Figure 4C:
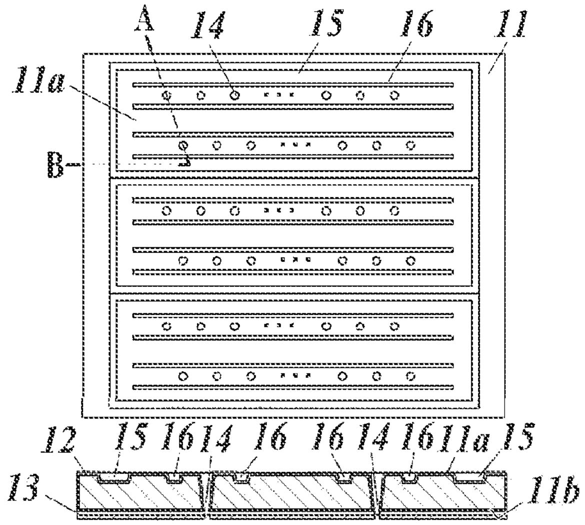
FIG. 4C is a top view and a cross-sectional view along the A-B line showing the nozzle plate manufacturing method according to the embodiment.

After cleaning the protective film 12, as shown in FIG. 4C, the water repellent film 13 is formed on the protective film 12. The water repellent film 13 is formed by a dry process, such as vacuum evaporation, using a silane coupling agent having perfluoroxyl groups, for example. As the silane coupling agents, amino silane coupling agents such as γ-aminopropyltriethoxysilane, N-β-aminoethyl-γ-aminopropyltriethoxysilane, N-β-aminoethyl-γ-aminopropyltrimethoxysilane, N-β-aminoethyl-γ-aminopropylmethyldimethoxysilane, N-phenyl-γ-aminopropyltrimethoxysilane, and γ-ureidopropyltriethoxysilane, and epoxysilane coupling agents such as γ-glycidoxypropyltrimethoxysilane, β-(3,4-epoxycyclohexyl)ethyl trimethoxysilane, and γ-glycidoxypropyl methyl diethoxysilane are applicable.

The method of forming the water repellent film 13 is not limited to this. The water repellent film 13 may be formed on the basis of conventionally known components and methods, for example, by immersing the substrate 11 in a solution of a fluorine-containing organosilicon compound diluted with a fluorinated solvent and then thermally drying it.

Next, the water repellent film 13 formed on surfaces other than the second surface 11*b* is removed (Step S105). Specifically, first, the second surface 11*b* is masked with polyimide tape and the substrate 11 is installed in an ashing machine. Exposure to $O_2$ plasma is made for several tens of seconds to remove the water repellent film 13 formed on the surfaces other than the second surface 11*b*. The polyimide tape is then removed and cleaned. By the method described above, the protective film 12 is formed on the entire surface of the substrate 11, and the water repellent film 13 is formed only on the second surface 11*b*.

Figure 4D:
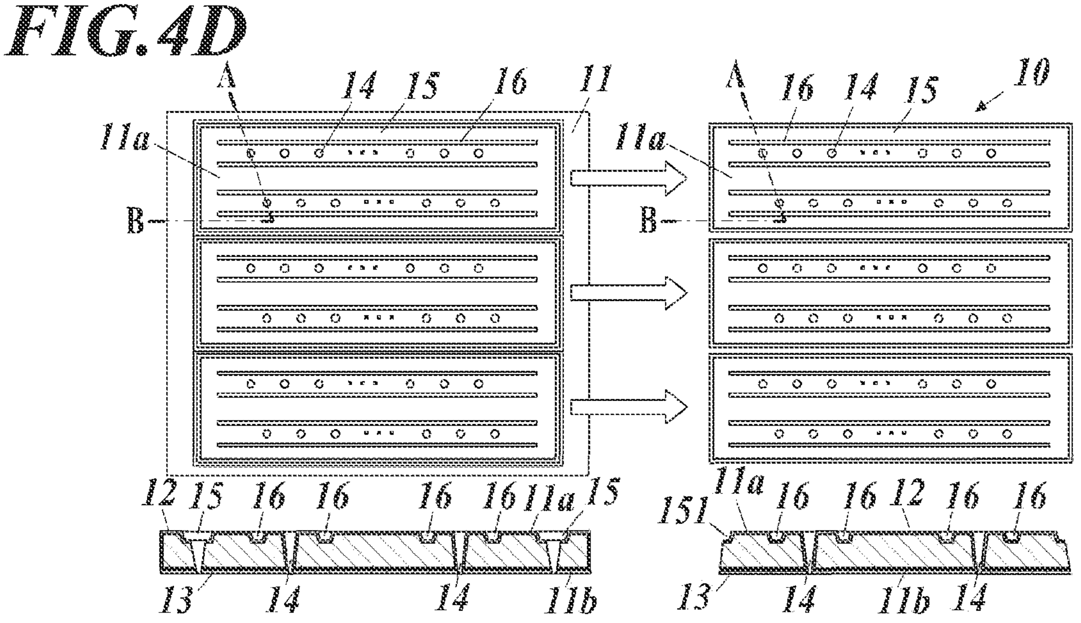
FIG. 4D is a top view and a cross-sectional view along the A-B line showing the nozzle plate manufacturing method according to the embodiment.

Next, as shown in FIG. 4D, external shaping is performed on the substrate 11 by laser processing (external shaping process, step S106).

In the external shaping process, the nozzle plate 10 is cut out from the base material by performing the laser processing with the laser equipment along the recess 15 of the substrate 11 on which the grooving was performed in step S101 which is a previous process, and by cutting the recess 15. For example, excimer laser light can be preferably used as the laser light generated by the laser equipment. This is because excimer laser light has a short wavelength and is capable of desirable microprocessing. The wavelength of excimer laser light ranges from 190 nm to 355 nm. Specifically, for example, ArF (wavelength of 193 nm), KrF (248 nm), XeCl (wavelength of 308 nm), XeF (wavelength of 351 nm), and the like are preferably cited. Conventional known laser beams such as YAG laser, $CO_2$ laser, and the like may be used as laser beams.

Since the laser processing in this process is performed by cutting the recess 15 of the nozzle plate 10 as described above, the step 151 as shown in FIG. 2 is formed at the edge of the nozzle plate 10 after the external shaping process.

In addition, when the external shaping is performed on the substrate 11 which is SUS by laser processing, in general, the dross 152 is formed near the processed portion. However, in the present invention, laser processing is performed along the recess 15, and thus the dross 152 is formed at the edge of the step 151 as shown in FIG. 2.

By the method described above, the nozzle plate 10 having the step 151 with the dross 152 formed on the edge of the substrate 11 is obtained. The head chip 2 is manufactured by stacking the nozzle plate 10 and the channel substrates 20, 40, and 50, and is combined with the common ink chamber 70, the support substrate 80, the wiring member 3, and the drive section 4 to be incorporated into a predetermined exterior member. Thereby, the inkjet head 1 is completed.

Next, the experiment conducted to confirm the height of the dross formed by the external shaping in the embodiment will be explained.

In this experiment, the height of the dross 152 formed when SUS is laser processed was evaluated.

Specifically, SUS304HTA material with a thickness of 50 μm was used as the base material, and a solid-state laser system using YVO4 crystals, MD-U1000C (manufactured by Keyence Corporation, wavelength: 355 nm, pulse width: 14 nsec, switch: 40 kHz, scan speed: 200 mm/sec) was used to perform laser processing by 20 scans at a time for each level of laser output (2.4 W/1.8 W/1.2 W/0.6 W) with or without assist gas. Next, 20 minutes of US cleaning was performed in pure water using 40 kHz ultrasonic waves. After the US cleaning, a laser microscope, VK-X250 (manufactured by Keyence Corporation) was used to measure the height of the dross 152 generated near the processed portion, and the average value was calculated.

Table I is a table showing the results of this experiment.
[Table 1]

TABLE I

| LEVEL | 1 | 2 | 3 | 4 | 5 | 6 | 7 | 8 |
|---|---|---|---|---|---|---|---|---|
| ASSIST GAS | NOT USE | NOT USE | NOT USE | NOT USE | USE | USE | USE | USE |
| OUTPUT (W) | 2.4 | 1.8 | 1.2 | 0.6 | 2.4 | 1.8 | 1.2 | 0.6 |
| DROSS HEIGHT (μm) | 7.6 | 5.7 | 3.9 | — (PROCESSING NOT POSSIBLE) | 3.9 | 4.2 | 4.3 | — (PROCESSING NOT POSSIBLE) |

As shown in levels 1 to 3 of Table 1, as the laser output is reduced, the height of the dross 152 can be reduced. However, as shown in levels 4 and 8, if the output is reduced to 0.6 W or lower, it is not preferable because it is no longer possible to perform the external shaping.

In addition, as shown in levels 5 to 7, the use of an assist gas can reduce the change in the height of the dross 152 due to changes in laser output, and the height can be stabilized at 5 μm or less.

As shown in Experiment 1, the height of dross 152 generated during laser processing is approximately 5 μm, especially 10 μm or less. Therefore, if the depth of the step 151 is approximately 5 μm, the dross 152 is less likely to cause bonding defects or void generation when bonding to the pressure chamber substrate 20. If the depth of the step 151 is approximately 10 μm, the dross 152 can be prevented from becoming an obstacle to bonding after external shaping, regardless of the conditions at the time of laser processing.

As described above, the method for manufacturing the nozzle plate 10 according to the embodiment at least includes a grooving process that is forming multiple recesses 15 in a single substrate by grooving in the wet etching on the portion to be subjected to the external shaping, a nozzle forming process that is forming multiple nozzles 14 by punching and polishing, and an external shaping process that is performing external shaping of the multiple nozzle plates 10 along the recesses 15 by laser processing.

According to such a method, the dross 152 generated by the external shaping process is generated in the step 151 formed by the grooving process. Therefore, when the nozzle plate 10 is bonded to the pressure chamber substrate 20, the occurrence of defects such as bonding defects and void generation can be suppressed.

In addition, in the method for manufacturing the nozzle plate 10 according to the embodiment, it is not necessary to remove the dross 152 generated at the edge of the nozzle plate 10 by polishing in order to suppress the occurrence of the aforementioned defects. Therefore, the nozzle plate 10 can be manufactured efficiently and the productivity is excellent.

In addition, in the method for manufacturing the nozzle plate 10 according to the embodiment, as shown in FIG. 4, each process can be performed to produce multiple nozzle plates 10 from a single substrate 11. Therefore, multiple nozzle plates 10 can be efficiently manufactured, and the productivity is excellent.

In addition, in the method for manufacturing the nozzle plate 10 according to the embodiment, since the external shaping is performed by laser processing, compared to the case where the external shaping is performed by wet etching, the process of forming and removing the resist mask becomes unnecessary, and resist residue inside the nozzle 14 is not generated. Therefore, the nozzle plate 10 can be manufactured efficiently and the productivity is excellent.

In addition, in the method for manufacturing the nozzle plate 10 according to the embodiment, even if the dross 152 is generated during the external shaping process, the occurrence of the aforementioned defects can be suppressed. Therefore, the nozzle plate 10 can be provided at a low cost without the need to use a short pulse laser device with a pulse width of picoseconds or femtosecond order.

In addition, the nozzle plate 10 manufactured by the manufacturing method according to the embodiment has the dross 152 at the step 151. Therefore, in bonding with the pressure chamber substrate 20, which is the upper layer substrate, with the adhesive, even if the amount of adhesive is large, it is possible to prevent the dross 152 from becoming a wall to make it protrude to the sides.

In addition, by using the nozzle plate 10 manufactured by the manufacturing method according to the embodiment, the inkjet head 1 can be manufactured inexpensively and efficiently, and the productivity is excellent.

The present invention is not limited to the embodiment, but can be modified in various ways.

For example, in the embodiment, the base material of the nozzle plate 10 is made of SUS, but the base material of the nozzle plate 10 is not limited to this. For example, other conventionally known materials such as a silicon substrate or electroformed metal such as Ni may be used.

In the embodiment, an example of forming the protective film 12 on the entire surface of the substrate 11 is used, but the range of forming the protective film 12 is not limited to this. The protective film 12 may be provided on at least a portion of the first surface 11*a* and the inner wall surface of nozzle 14 in the surface of the substrate 11 (that is, any range which ink may come into contact with and requires the ink resistance).

Although the protective film 12 is a monolayer structure, the composition of the protective film 12 is not limited to this, and a multilayer structure is also acceptable. If the protective film 12 is unnecessary, the nozzle plate 10 does not need to be provided with the protective film 12.

The inner wall surface of the nozzle 14 may be tapered so that the closer it is to the opening of the nozzle 14, the smaller the cross-sectional area parallel to the first surface 11*a* is.

The nozzle 14 in the nozzle plate 10 may include a connecting passageway having an opening wider than the nozzle 14, an ink channel leading ink that is discharged without being ejected from the nozzle 14, or the like. The shape of the nozzle 14 is not limited to the abbreviated conical shape as shown in FIG. 2.

In cases where the inkjet head 1 does not need to have the water repellency in the ink ejection surface, the nozzle plate 10 does not necessarily need to be provided with the water repellent film 13.

The embodiment illustrates, as an example, the inkjet head 1 in the vent mode that fluctuates the pressure of ink in the pressure chamber 21 by deforming the piezoelectric element 60 and causes ink to be ejected. However, this is not intended to be a limitation. For example, the present invention may be applied to the inkjet head in the shear mode, in which a pressure chamber is provided inside the piezoelectric body and the pressure of ink in the pressure chamber is fluctuated by generating the shear mode type displacement in the piezoelectric body on the wall of the pressure chamber. The present invention is not limited to the method of deforming the pressure chamber. For example, the present invention may also be applied to the inkjet head of the thermal method which ejects ink by generating bubbles in the ink by heating.

In the embodiment, in the grooving process, the recess 15 is formed by wet etching. However, the processing to form the recess 15 is not limited to this, and the recess 15 may be formed by laser processing. However, it is preferable to form the recess 15 by wet etching since laser processing may cause distortion and warping of the base material.

Although some embodiments of the present invention have been described, the scope of the present invention is not limited to the embodiments described above, but includes the scope of the invention as described in the claims and their equivalents.

INDUSTRIAL APPLICABILITY

The present invention is applicable to the nozzle plate to prevent bonding defects or voids during bonding.

EXPLANATION OF REFERENCE NUMERALS

1 inkjet head
10 nozzle plate
11*a* first surface
11*b* second surface
13 water repellent film
14 nozzle
15 recess
20 pressure chamber substrate (upper layer substrate)
151 step
152 dross

The invention claimed is:

1. A nozzle plate of an inkjet head, the nozzle plate comprising:
- a first surface that is bonded to an upper layer substrate by an adhesive; and
- a second surface in which an opening of a nozzle that ejects an ink is provided, wherein
- the first surface and the second surface are opposite sides of the nozzle plate,
- a step is formed at an edge of the first surface, and
- an edge of the second surface is planar.

2. The nozzle plate according to claim 1, wherein a dross is attached to the step.

3. The nozzle plate according to claim 1, wherein a base material that forms the nozzle plate is silicon or metal.

4. The nozzle plate according to claim 1, wherein the step has a depth of 5 μm to 10 μm inclusive, in a center direction of the nozzle plate.

5. An inkjet head comprising the nozzle plate according to claim 1.

6. A nozzle plate manufacturing method for the nozzle plate according to claim 1, the nozzle plate manufacturing method comprising:

a grooving process that is forming a recess in the first surface so as to form external shapes of multiple nozzle plates for a single base material;

a nozzle forming process that is forming the nozzle such that the opening is formed in the second surface of the base material; and an external shaping process that is cutting the recess by laser processing and cutting out the nozzle plates from the base material, wherein the first surface and the second surface are the opposite sides of each of the nozzle plates, the step is formed at the edge of the first surface of the each of the nozzle plates, and the edge of the second surface of the each of the nozzle plates is planar.

7. The nozzle plate manufacturing method according to claim 6, wherein the recess is formed by wet etching.

8. The nozzle plate manufacturing method according to claim 6, further comprising a water repellent film forming process that is forming a water repellent film in the second surface.

9. An inkjet head manufacturing method comprising:

a nozzle plate manufacturing process that is manufacturing the nozzle plate according to claim 1; and a bonding process that is bonding the first surface of the nozzle plate to the upper layer substrate by the adhesive.

10. The nozzle plate according to claim 1, wherein the step is formed at a whole circumferential edge of the first surface.

* * * * *